United States Patent
Madsen (10) Patent No.: US 12,459,686 B2
(45) Date of Patent: Nov. 4, 2025

(54) DEVICE FOR PLACING LIDS ON CONTAINERS

(71) Applicant: Primoreels A/S, Vipperød (DK)

(72) Inventor: Valdemar Hougaard Madsen, Vipperød (DK)

(73) Assignee: Primoreels A/S, Vipperød (DK)

( * ) Notice: Subject to any disclaimer, the term of this patent is extended or adjusted under 35 U.S.C. 154(b) by 208 days.

(21) Appl. No.: 18/335,859

(22) Filed: Jun. 15, 2023

(65) Prior Publication Data

US 2024/0417117 A1     Dec. 19, 2024

(51) Int. Cl.
*B65B 7/28* (2006.01)
*B65B 43/42* (2006.01)
*B65B 57/10* (2006.01)

(52) U.S. Cl.
CPC .......... *B65B 7/2842* (2013.01); *B65B 7/2807* (2013.01); *B65B 7/2814* (2013.01); *B65B 43/42* (2013.01); *B65B 57/10* (2013.01)

(58) Field of Classification Search
CPC ..... B65B 7/2842; B65B 7/2814; B65B 43/42; B65B 7/2807; B65B 57/10; B65G 2201/02; B65G 201/0244; B65G 2201/0235
USPC .......................................................... 198/418
See application file for complete search history.

(56) References Cited

U.S. PATENT DOCUMENTS

| | | | | |
|---|---|---|---|---|
| 3,282,025 A | * | 11/1966 | Amberg | B65B 7/2807 53/367 |
| 3,293,823 A | * | 12/1966 | Anderson | B65B 7/2842 53/307 |
| 4,437,757 A | * | 3/1984 | Komori | G03G 21/206 399/160 |
| 5,946,886 A | * | 9/1999 | Bealer | B65B 7/2807 53/287 |
| 6,073,422 A | * | 6/2000 | Massey | B65B 43/54 53/471 |
| 11,325,729 B2 | * | 5/2022 | Davis | B65B 7/2828 |
| 2012/0037271 A1 | * | 2/2012 | Davidson | B65B 39/14 141/129 |
| 2021/0139258 A1 | * | 5/2021 | Kirihara | B65B 7/2842 |
| 2022/0340314 A1 | | 10/2022 | Davis | |

FOREIGN PATENT DOCUMENTS

| | | | | |
|---|---|---|---|---|
| CN | 110589049 A | * | 12/2019 | ........... B65B 7/2807 |
| EP | 0 238 421 | | 4/1990 | |
| EP | 1 306 307 | | 5/2003 | |
| EP | 2 749 523 | | 7/2014 | |

(Continued)

OTHER PUBLICATIONS

Screenshot of Packaging World webpage and snap shots taken from a video from the Pack Expo®, international trade show held Oct. 23-26, 2022, video published Nov. 10, 2022, available at https://www.packworld.com/PACKEXPO/video/22539199/decontaminating-rollfed-lidding.

(Continued)

*Primary Examiner* — James R Bidwell
(74) *Attorney, Agent, or Firm* — KNOBBE, MARTENS, OLSON, & BEAR, LLP (57) ABSTRACT

The present invention relates to a device for placing lids onto containers, the device preferably comprises a number of placement devices each being configured to releasable retain a lid in a fixed position relatively to the placement device, and being moveable in a longitudinal direction of the device.

20 Claims, 6 Drawing Sheets

(56) References Cited

FOREIGN PATENT DOCUMENTS

| EP | 3 241 803 | 11/2017 |
| GB | 419 239 | 11/1934 |
| KR | 100 801 146 | 2/2008 |

OTHER PUBLICATIONS

Snap shots taken from a video from the Pack Expo®, international held Oct. 23-26, 2022 available at https://www.youtube.com/watch?v=1rntnmVdLhwc.
International Seach Report mailed Sep. 27, 2024 in pct/ep2024/066605 filed Jun. 24, 2024.

* cited by examiner

DEVICE FOR PLACING LIDS ON CONTAINERS

FIELD

The present invention relates to a device for placing lids onto containers, the device preferably comprises a number of placement devices each being configured to releasable retain a lid in a fixed position relatively to the placement device, and being moveable in a longitudinal direction of the device.

BACKGROUND OF THE INVENTION

In e.g. dairy industries, liquids are filled into containers and the containers are subsequently closed by application of a lid. The lids may be provided as a row of lids where lids are positioned next to each other. In order to reduce material waste, the lids are typically placed very close to each other, and even with substantially no distance between the lids in the row of lids.

Naturally, containers containing a liquid are placed with their open ends facing upwardly. That often means that the lids are to be placed onto the open ends by a process where the lids are conveyed from a reel of lids toward a position above the open ends and subsequently conveyed downwardly onto the open ends of the containers for application.

In many dairy industries, the containers are conveyed by a conveyer structure comprising receptacles for receiving the containers. The centre-to-centre distance between the receptacles is typically larger than a centre-to-centre distance in-between the lids in the row of lids. Accordingly, lids are typically to be conveyed to a position above the lids, separated from each other, spaced with a centre-to-centre distance matching the distance between the containers, and moved to the open ends of the containers. Thus, the application of lids involves a relatively complex handling of lids.

In addition, the speed at which the lids are placed on the containers should preferably be fast so that it does not form a bottle-neck in a production facility. Accordingly, a fast and efficient device for placing lids onto containers would be desirable.

OBJECT OF THE INVENTION

It is a further object of the present invention to provide an alternative to the prior art.

In particular, it may be seen as an object of the present invention to provide a device for placing lids onto containers that solves the above mentioned problems of the prior art.

SUMMARY OF THE INVENTION

Thus, the above described object and several other objects are intended to be obtained in a first aspect of the invention by providing a device for placing lids onto containers, the device preferably comprises a number of placement devices each
being configured to releasable retain a lid in a fixed position relatively to the placement device, and
being moveable in a longitudinal direction of the device,
a non-rotational first gear being moveable reciprocatable in a direction being perpendicular, or essentially perpendicular, to said longitudinal direction, a carrier rotationally arranged around a centre of the first gear and a second gear having a radius smaller than the radius of the first gear and being rotationally arranged on said carrier, wherein said first and said second gears are in toothed engagement or said first and second gears are connected by a toothed belt;
a number of moving elements arranged on a shaft extending in said longitudinal direction, said shaft is connected to the second gear to rotate said shaft by rotation of said second gear, each of said moving element is configured to co-operate with one of said placement devices to provide longitudinal movement of one of said placement device upon a rotation of said shaft,
a frame carrying said placement device while allowing for said longitudinal movement in said longitudinal direction, said frame being connected to said carrier,
an actuator device being configured to reciprocate said first gear and rotate said carrier whereby the placement devices are moved between a first position wherein said fixed positions faces in an first direction and a second position wherein said fixed positions faces in a second direction and whereby the placement devices are moved longitudinally.

Terms used herein are used in a manner being ordinary to the skilled person. Some of the used terms are elucidated here below.

Reciprocatable is typically used to reference a linear movement forth and back without rotational movement.

Gears as used herein e.g. in relations to first and seconds gears are preferably to be interpreted broadly as such gears may be gears having teeth where teeth of the first gear and teeth of the second gear engage directly with each other. In other embodiments, the gears engage each other by use of a timing belt. Thus, gears may in some embodiment also be referred to as timing belt pulleys

BRIEF DESCRIPTION OF THE FIGURES

The present invention and in particular preferred embodiments thereof will now be described in more detail with regard to the accompanying figures. The figures show ways of implementing the present invention and are not to be construed as being limiting to other possible embodiments falling within the scope of the attached claim set.

DETAILED DESCRIPTION OF PREFERRED EMBODIMENTS

Figure 1:
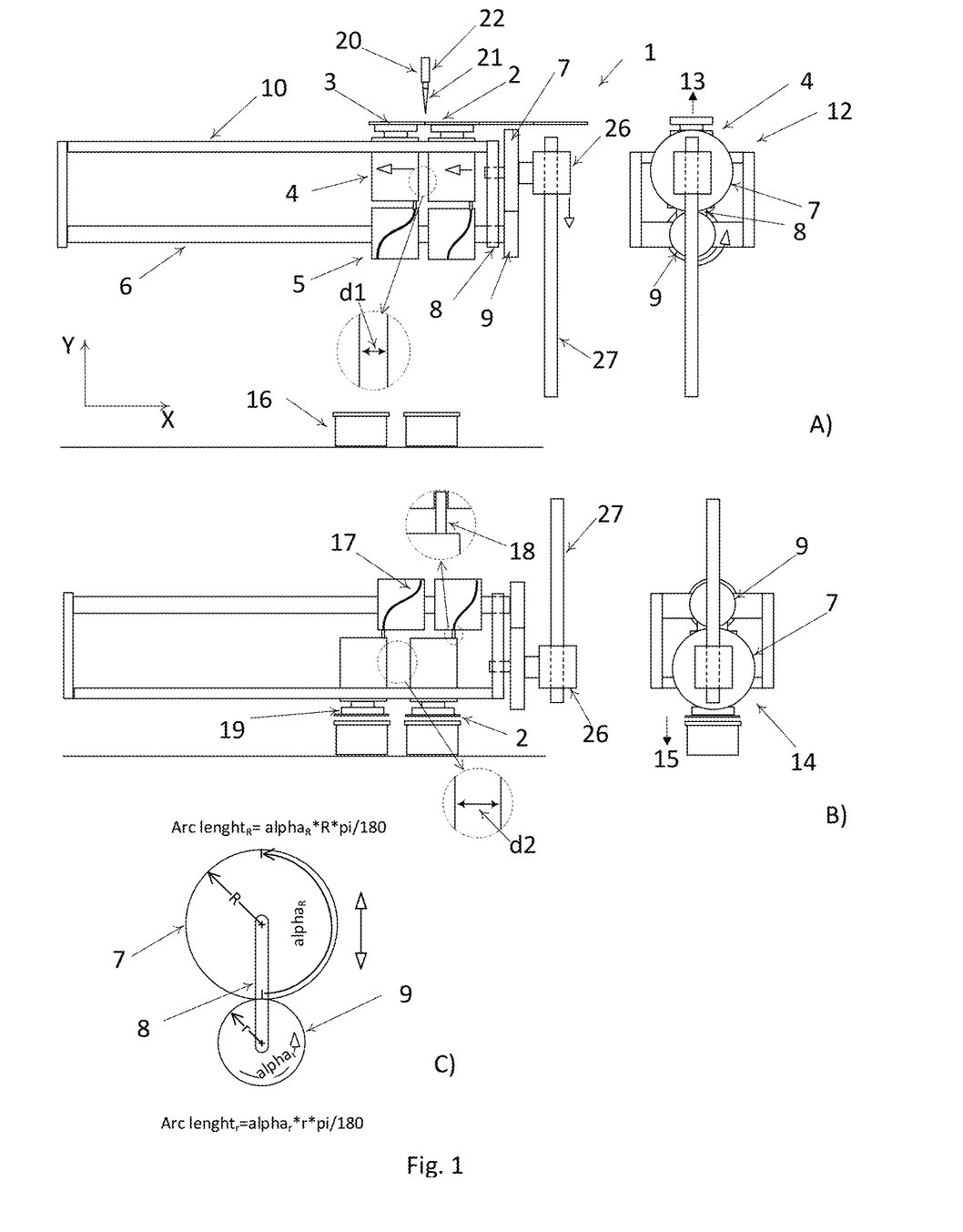
FIG. 1 schematically illustrates a first embodiment of a device for placing lids onto containers; the left hand side figure is a side view and the right hand side is an end view. The upper part A) illustrates the device in a first position and the middle part b) illustrates the device in a second position. The lower part C) schematically illustrates that the second gear rotates while the first gear does not rotate when the device moved from the first to the second position.

Reference is made to FIG. 1 schematically illustrating a first embodiment of a device 1 for placing lids 2 onto containers 16. In FIG. 1, the device 1 is positioned in a position above the containers 16, however the invention is not limited to such a positioning as the positioning of the device 1 relatively to the containers may essentially be any positioning.

In the embodiment of FIG. 1, the lids 2 are to be conveyed from an upper position to a lower position, where the containers are positioned. As will become apparent from the following description, the conveying of the lids from the upper position to the lower position includes a flipping of the lids so that the surface facing upwardly in FIG. 1A will end up face downwardly towards the opening of the containers 16 as illustrated apparent from FIG. 1B.

Figure 4A:
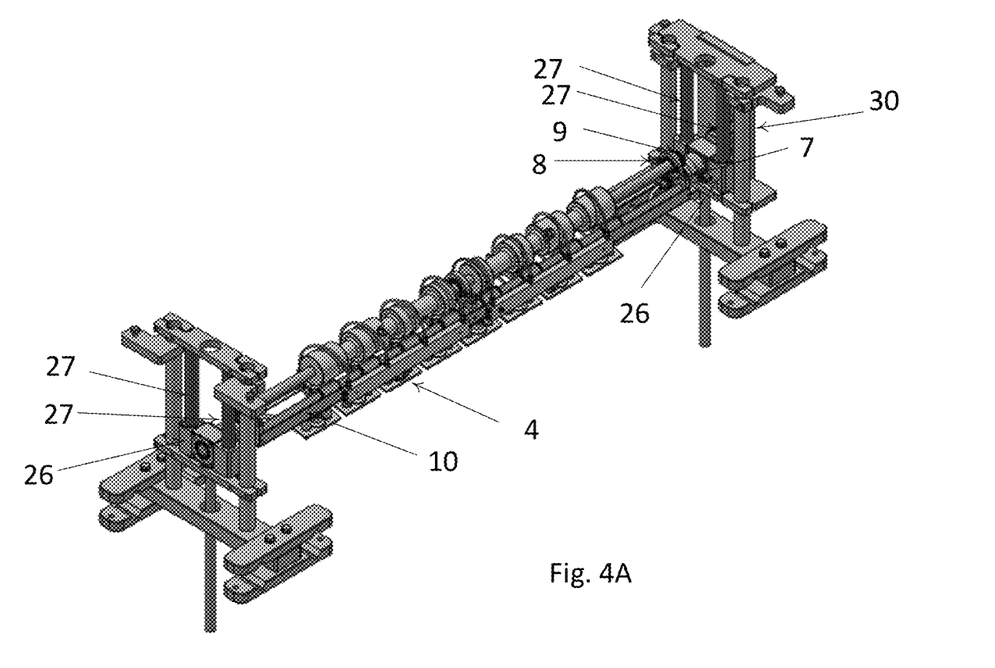

To provide such a relocation of the lids 2, the device 1 has inter alia a number of placement devices 4 for placing lids onto the containers 16. In FIG. 1 two such placement device 4 are illustrated, however, and as exemplified in FIG. 4, more than two placement devices 4 may be present (in FIG. 4, eight placement devices are illustrated).

Each of the placement devices 4 is configured to releasable retain a lid 2 in a fixed position 3 relatively to the placement device 4. Releasable here refers to that the placement devices can hold lids in a manner at least preventing lids 2 from leaving their position relatively to placement device during relocation of the lids, while at the same time releasing the lids 2 upon a demand from e.g. a control unit. In the embodiment of FIG. 1, the placement devices 4 each has an element facing outward to receive and retain a lid 2, which element in the embodiment of FIG. 1 is a suction disc 19. Other types of retaining mechanisms than a suction may be embodied such as an electromagnet for retaining a lid containing metal.

Each of the placement devices 4 is arranged so as to be moveable in a longitudinal direction of the device. Typically, and as illustrated in FIG. 1, the placement devices 4 are arranged side-by-side, whereby the longitudinal direction may be defined as the direction in which the placement devices 4 extend side-by-side. With reference to the co-ordinate system shown in FIG. 1, the longitudinal direction is in the x-direction.

A rotating mechanism is provided in the device 1. An exemplified embodiment of such a rotating mechanism is illustrated FIG. 1C. This rotating mechanism has a non-rotational first gear 7 and this first gear 7 is moveable reciprocatable in a direction perpendicular to the longitudinal direction as illustrated by the arrow next to the first gear 7 in FIG. 1C. With reference to FIG. 1, the longitudinal direction is the x direction and the perpendicular direction is the y direction indicated in the co-ordinate system in FIG. 1A.

The illustrated rotating mechanism also has a carrier 8 and a second gear 9. The carrier is rotationally arranged around a centre of the first gear 7 and the second gear 9 is rotationally arranged on the carrier 8. The second gear 9 has a radius smaller than the radius of the first gear 7. As illustrated in FIG. 1C, the carrier is an element extending at least between the centres of the first and second gears 7, 9. The first and the second gears 7, 9 are in toothed engagement with each other. In attempt to render the function of the device more clear, the teeth of the gears have been left out (as also left out in FIG. 1A and FIG. 1B).

As perhaps most clearly visible from FIG. 1C, a rotation of the carrier 8 around the centre of the first gear 7 will provide a rotation of the second gear 9 around its own centre as well as a rotation around the centre of the first gear 7 due to the toothed engagement. As indicated in FIG. 1C the rotation of the second gear 9 around its own centre by a rotation of the carrier 8 can be evaluated by:

$$\text{Carrier 8, Arc length}_R: L_R = \alpha_R R \frac{\pi}{180}$$

$$\text{Gear 9, Arc length}_r: L_r = \alpha_r r \frac{\pi}{180}$$

where α is angle rotation in degrees for the carrier 8 and the second gear 9 respectively. Since there is no slip between first and the second gears 7, 9 upon rotation, due to the toothed engagement, the arc length for both gears will be the same upon a rotation of the carrier 8:

$$L_R = \alpha_R R \frac{\pi}{180} = L_r = \alpha_r r \frac{\pi}{180}$$

$$=> \alpha_r = \frac{R}{r} \alpha_R$$

Figure 3:
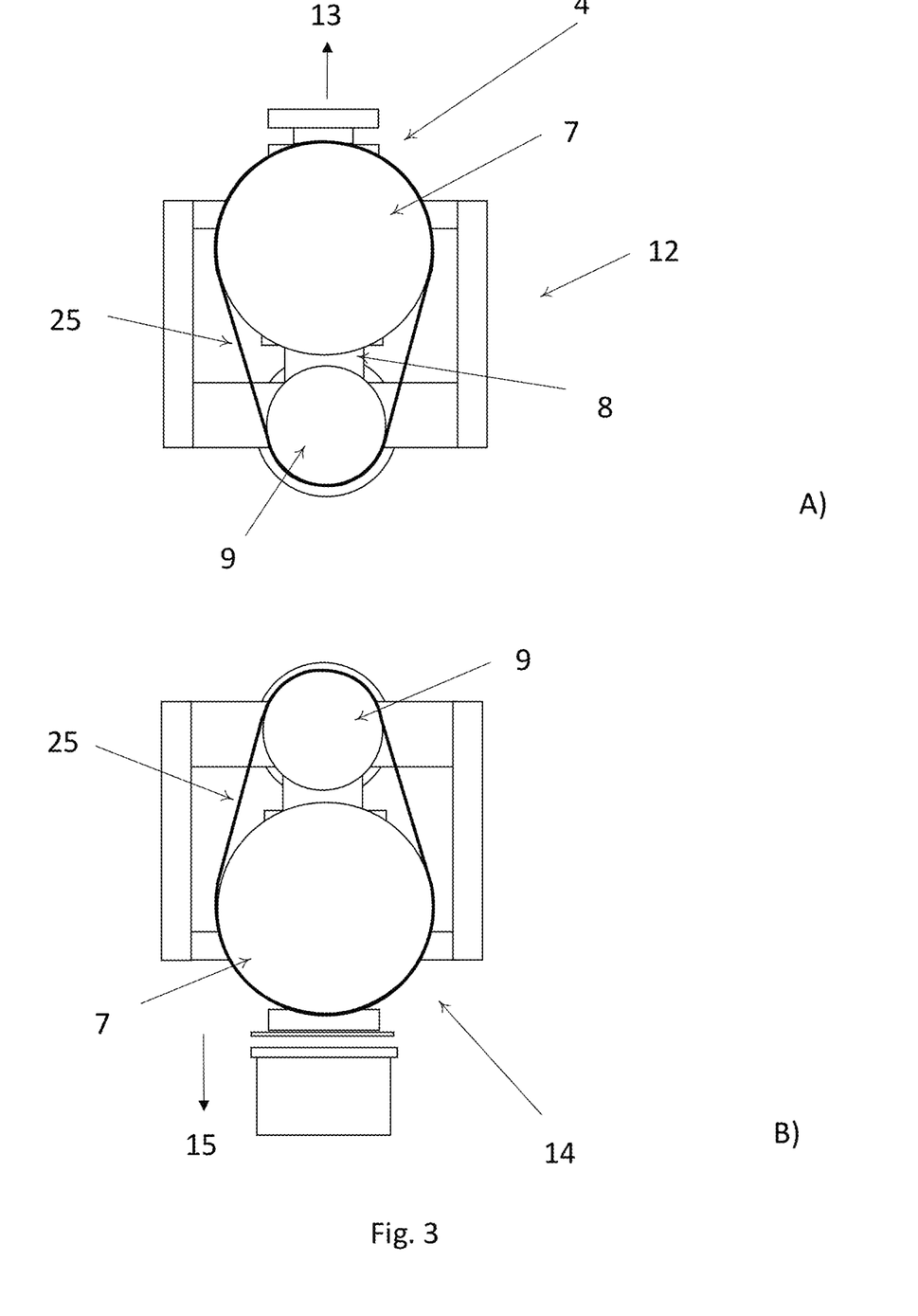
FIG. 3 schematically illustrates an embodiment in which the first and second gears are connected by a toothed belt FIG. 4A schematically illustrates in a 3-dimensional view a second embodiment of a device for placing lids onto container.

As will become apparent from the description linked to FIG. 3 a similar relation exists when the engagement between the first and the second gears 7, 9 is provided by a toothed belt 25, although the rotation direction of the second gear 9 will be reversed, and the correlation between $\alpha_r$; $\alpha_R$ is different from the above.

Figure 2:
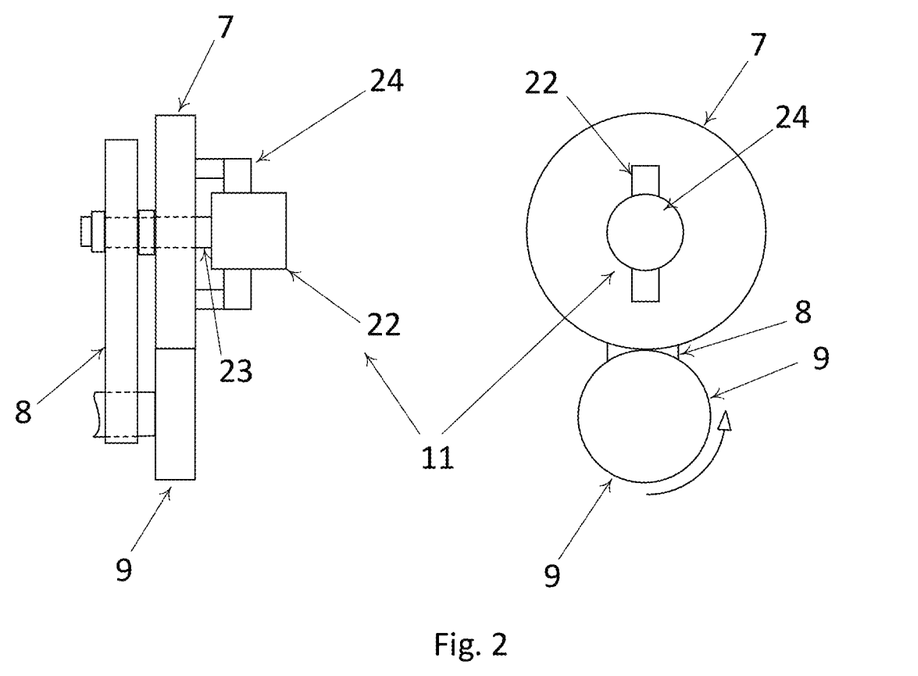
FIG. 2 schematically illustrates a part an actuator device according to an embodiment, the illustrated part provides a rotational movement.

While the second gear 9 in FIG. 1 and FIG. 2 is arranged outside the first gear 7, the second gear 9 may be arranged inside the first gear as illustrated in FIG. 5. In this embodiment, the first gear 7 is a circular toothed rim where the teeth extends inwardly toward the centre of the toothed rim, and the teeth of the second gear 9 extend outwardly. During use, the teeth of the first and the second gears 7, 9 are in direct contact.

For embodiments like the one illustrated in FIG. 1 and FIG. 2, the above relation between $\alpha_r$ and $\alpha_R$ can be used to determine the radius of the second gear 9 in regards to a selected radius of the first gear 7 and the amount of rotation of the carrier 8. In a preferred embodiment, the carrier 8 is to rotate 180 degrees. By this, the rotation of the second gear 9 can be found as:

$$\alpha_r = \frac{R}{r} 180$$

As will become apparent from the following, the rotation of the second gear 9 is to provide a longitudinal movement of the placement devices 4, and the actual amount of rotation of the second gear 9 and the radius of the second gear are typically selected in accordance with an amount of longitudinal movement required or desired.

To provide for such a longitudinal movement, the device has a number of moving elements 5, preferably one for each placement device 4. The moving elements 5 are arranged in fixed positions on a shaft 6 extending in the longitudinal direction of the device 1 (x direction in FIG. 1). The shaft 6 is connected to the second gear 9 so that when the second gear 9 rotates around its own axis, the second gear 9 rotates the shaft 6, thereby rotating the moving elements 5 around the same axis as the second gear 9 rotates. In the embodiment of FIG. 1, each of the moving elements 5 are cylindrically shaped, but the invention is not limited to such cylindrical shape.

Each of said moving element 5 is configured to co-operate with one of said placement devices 4 to provide longitudinal movement of one of said placement device 4 upon a rotation of said shaft 6. Accordingly, in some embodiments the rotational motion of the moving elements 5 is converted into a linear translatory movement of the placement devices 4.

The device of FIG. 1 also has a frame 10 carrying the placement device 4. The frame 10, besides carrying the placement devices 4, is also configured to allow for the longitudinal movement in longitudinal direction of the placement devices 4. In preferred embodiments, the placement devices 4 are slidingly carried on one or more longitudinal extending rods, and these one or more rods are connected to the frame 10. Alternatively or in combination with such longitudinal extending rods, linear guides allowing for a longitudinal movement of the placement devices 4 only, such as rails may be used. An embodiment thereof is disclosed in connection with FIG. 4. Is it noted that such one or more rods may also form at least a part of the frame 10. The placement devices 4 are preferably non-rotatable carried by the frame 10, so that the movement of the placement devices 4 relatively to the frame is a linear translatory movement in the longitudinal direction of the device 1.

The frame 10 is preferably rigidly connected to the carrier 8, whereby a rotation of the carrier 8 will provide an equal rotation of the frame 10 and thereby also the placement devices 4.

Accordingly, when the carrier 8 is rotated, the frame 10 is rotated. In the embodiment of FIG. 1, the carrier 8 is rotated 180 degrees, whereby the placement devices 4 will be turned upside-down as illustrated by the different positions shown in FIG. 1A and FIG. 1B. During the rotation of the carrier 8, the moving element 5 provides a longitudinal movement of the placement devices 4 so that the distance between two neighbouring placement devices 4 is changes. In the embodiment of FIG. 1, the distance between two neighbouring placement devices is labelled d1 (FIG. 1A) and d2 (FIG. 1B) and in this embodiment, d2>d1. However, the invention is not limited to d2>d1 as d1>d2.

While the rotation of the carrier turns the placement devices 4 upside-down—or in general rotates the placement devices 4—the lids are also to be arranged in close proximity to the position of the containers where the lids are to be arranged. In the embodiment of FIG. 1, the movement of the placement devices 4 besides rotating also involves a movement in a direction being perpendicular to the longitudinal direction (y-direction).

Preferred embodiments comprising an actuator device (not illustrated in FIG. 1) which is configured to reciprocate the first gear 7 and said carrier 8 (to rotate second gear 9). By this, the placement devices 4 are moved between a first position 12, wherein the fixed positions 3 faces in a first direction 13 and a second position 14 wherein the fixed positions 3 faces in a second direction 15 and whereby the placement devices 4 are moved longitudinally.

As illustrated in FIG. 1, the moving elements 5 may further be configured to provide an amount of longitudinal movement of said placement devices 4 so that a first longitudinal distance d1 between neighbouring placement devices 4 in the first position 12 is smaller than a second longitudinal distance d2 between neighbouring placement devices 4 in the second position 14. This is advantageous in particular in relation to use of a row of lids in which the distance between neighbouring lids in the rows is smaller than the distance between neighbouring containers 16 when these containers are placed in a position where the lids are to be placed onto the containers. In some preferred embodiments, the lids in a row of lids are arranged so that there is essentially now distance between neighbouring lids whereas there is a distance between neighbouring containers. Accordingly, the lids may be advanced to a position above the placement devices 4 and after the lids are retained by the placement devices in the first position, the device positions the retained lids in the second position with a distance in between the lids matching the position of the containers 16.

Accordingly, in preferred embodiments, the first longitudinal distance d1 is substantially equal to the distance between two neighbouring lids in an associated row of lids and the second longitudinal distance d2 is substantial equal to the distance between two neighbouring container receptacles in an associated conveyer device for conveying the containers 16 while being received in the receptacles.

A conveyer device is to be understood broadly as device configured to move one or more container 16. Typical types of conveyers comprised in preferred embodiments are linear, rotary, carousel stepwise and/or continuous motion conveyers which refers to the type of movement receptacles comprised in the conveyer is moved. Typically, the receptacles are comprised in what is commonly referred to as transfer plates.

For linear movement (in-line), the transfer plates are preferably indexed stepwise in a direction transversely to the transfer plates.

For rotary movement, the transfer places are preferably indexed stepwise around a centre of the conveyer.

For carousel movement, the transfer plates are preferably indexed stepwise in a direction along the transfer plates.

For continuous movement, the transfer plates are preferable moved continuous.

It is noted that while the disclosure of the various movements is made with reference to the presence of transfer plates, conveyers not having transfer plates is considered with the scope of the invention. In such embodiments, the disclosed movements may preferably refer to the movement of the containers.

It is noted that the distance d1 may be substantially zero or larger than zero. The distance d2 is preferably larger than d1, although d2<d1 in preferred embodiments.

As illustrated in FIG. 1 each of the moving element 5 is configured to co-operate with one of the placement devices to provide the longitudinal movement. This preferred mechanism is detailed in FIG. 1B in the close-up view illustrating the follower 18. The preferred mechanism is provided by each of the moving element comprising a guide 17 and each of the placement devices 4 comprises a follower 18 engaging the guide 17. In the disclosed embodiment, the guide 17 is a curved rail formed by a groove provided in the moving element 5. The moving elements are preferably in the form of cylindrical elements arranged in non-rotatable and longitudinal fixed positions along the shaft 6. Thus, when the shaft 6 is rotated, the followers engaging the guides will move the placement devices longitudinally.

The actual shape of the guides are preferably adapted to provide the desired amounts of linear movement of the placement devices 4 and in particular to the spreading (d1 to d2) of the placement devices 4. Due to mechanical consideration, it may be preferred that the amount of rotation of the shaft 6 is large, such as large as possible although smaller than 360 degrees to avoid overlapping of a guide 17 in a moving element 5

In preferred embodiments, each of the guides 17 is a groove and each of the followers 18 is a pin having at least a section shaped to fit snuggly within said groove.

An advantageous manner of retaining lids is to use a suction disc which is connected to a pump to provide a suction, such that when a lid is arrange on the suction disc, the pump such air out thereby decreasing the pressure which retains the lid on the suction disc. Release of a lid can be provided by allow air to enter into the suction disc, where the pressure increases. Accordingly, in preferred embodiments each of the placement devices 4 comprises a suction disc 19 to retain a lid 2 in the fixed position by a vacuum and release said lid 2 by release of the vacuum. It is emphasised that vacuum in this context does not refer to a pressure of absolute zero, but refers to a pressure being reduced relatively the ambient pressure. The amount of vacuum is selected in accordance with the shaping of the suction discs and the mechanical properties of the lids so that the applied vacuum does not permanently deforms lids when retained by the suction disc.

Lids are in some preferred embodiments arranged as a row of lids where lids are arranged neighbouring to each other in a longitudinal direction of the row. The individual lids in the row may be connected to each other along a perforated line allowing an easier separation of lids compared to embodiments where neighbouring lids are connected without a perforated line. To provide a separation of lids, preferred embodiments may further comprising a lid separating device 20. One such example is indicated in FIG. 1 where a knife or a knife-like element is arranged above the illustrated row of lids. The lid separation device 20 is configured to separate two neighbouring lids in a row of lids, preferably while such two neighbouring lids are retained in said fixed position with the device in said first position 12.

In the embodiment shown in FIG. 1, the lid separating device 20 comprising an edged device 21, such as a knife, arranged on an activatable actuator 22 which is configured to upon activation to press an edge of the edged device 21 against a surface of the row of lids to provide a separation of said associated row of lids into individual lids. During use, a row of lids is typically advanced along the longitudinal direction of the device and brought into a position so that a lid is placed right over a suction disc (or other retaining device). After this, the suction discs are activated to retain the lids in fixed position, where after the edged devices 21 are brought into a position pressing the edges against the row of lids thereby separating the row of lids into individual lids.

In preferred embodiments, the lid separating device 20 comprising an edged device 21, such as a knife, arranged at a fixed position above a feed plane of the associated row of lids. The feed plane is the plane in which the row of lids are fed into position above the placement devices. The placement devices 4 are configured to move the associated row of lids towards said edged device 21 and press a surface of said associated rows of lids to provide a separation of said associated row of lids into individual lids. This movement may be accomplished by providing an upward translatory movement of the frame 10 without rotating the carrier 8.

With reference to in particular FIG. 2, an embodiment of the actuator device 11 may comprising an electrical or pneumatic motor 22. The motor 22 has an axle 23 which is connected to the carrier 8 so that rotation of the axle 23 causes a rotation of the carrier 8. Alternatively, the axle 23 may be connected to the frame 10 to rotate said frame 10 which causes a rotation of the axel 23 the mechanical coupling between frame 10 and the second gear 9 through the carrier 8. Since the rotation is to be controlled to move the placement device 4 between the first and the second position 12, 13, the amount of angular rotation of the motor is preferably controllable. When an electrical motor is used, the electrical motor may advantageously be a stepper motor controlled by a control unit (not illustrated).

In a further embodiment (not illustrated), the actuator device 11 may comprising an electrical or pneumatic motor 22 having an axle 23 connected to the second gear 9. Thereby, the second gear 9 is rotated by rotation of the axle 23, and the motor rotates with the second gear 9. It is however noted, that the motor is connected to the device in such a manner that although it rotates with the second gear 9, a rotation of the axle relatively to e.g. a housing of the motor is still obtained.

As detailed herein, a reciprocation of the first gear 7 is to be provided. One embodiment of such a mechanism comprises a linear guide element having a hub part 26 and one or more linear rails 27 as illustrated in the embodiment shown in FIG. 4A. In the illustrated embodiment a linear guide element is arranged at both ends of the device and each guide element comprises two linear rails 27. The guide rails are parallel arranged and extend in vertical direction. The hub part 26 is slidably arranged on the linear rails 27. Thus the combination of the hub part 26 and the linear rails 27 allows for a reciprocation of inter alia the first gear 7 when connected to the hub parts 26.

Figure 4B:
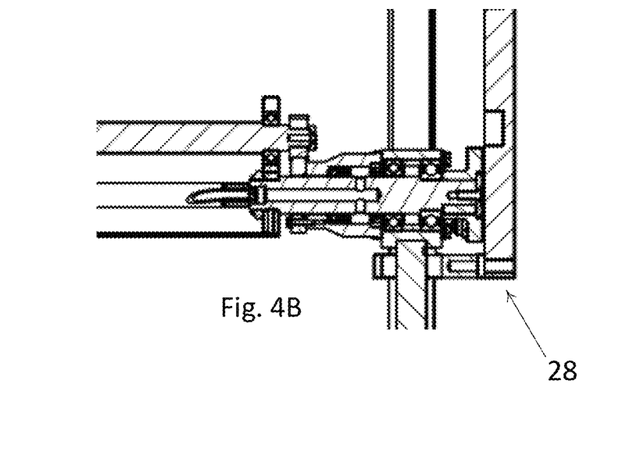
FIG. 4B discloses a longitudinal cross sectional view of a section of the device illustrated in FIG. 4A.
Figure 4C:
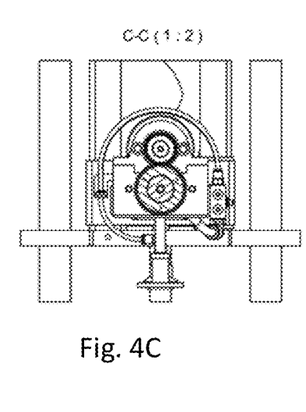
FIG. 4C discloses a transverse cross sectional view of a section of the device illustrated in FIG. 4A.

As disclosed in FIGS. 4A, 4B and 4C, the carrier 8 is rotatable arranged on said hub part 26. This connection is also disclosed in FIG. 1A and FIG. 1B. Further, the first gear 7 is non-rotatable arranged on the hub part 26, and the hub part 26 is connected to the actuator device to reciprocate the hub part 26 and thereby provide said reciprocatable movement of said first gear 7.

The actuator device for providing the reciprocating movement of the hub part 26 preferably comprises a linear actuator, such as an electrical or a pneumatic actuator, including e.g. a spindle for the electrical actuator or a piston for a pneumatic actuator. In another embodiment, the actuator device comprises a rotating crankshaft member to which a connecting rod is arranged off-centred so that the rotation of the crankshaft member provided a reciprocating movement of the connecting rod.

Figures 5A, 5B, 5C:
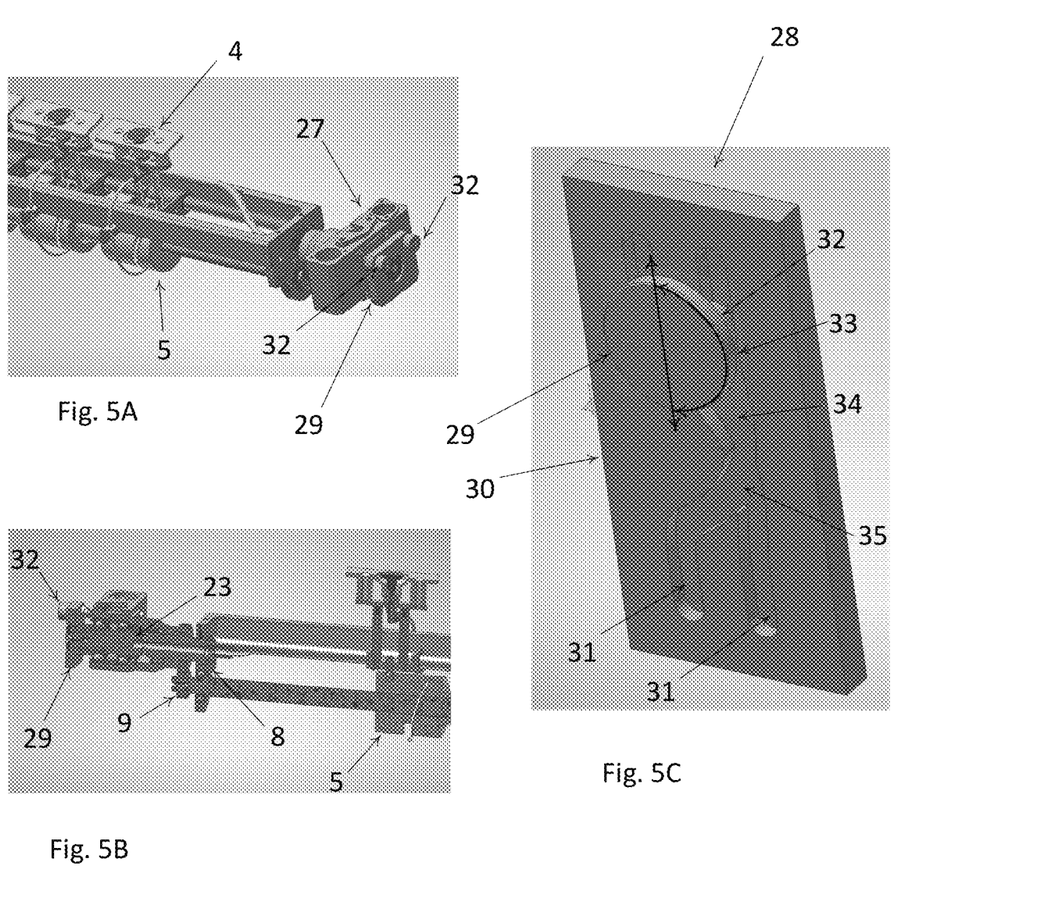
FIG. 5A schematically illustrates, in a 3-dimensional view, a close-up of the device illustrated in FIG. 4A-C with some details left out for clarity.
FIG. 5B is a longitudinal cross sectional view of the view of FIG. 5A (kindly observe that FIG. 5B is rotated around 180 degrees relatively to the view presented in FIG. 5A).
FIG. 5C is a 3-dimensional view of rotating device forming part of the actuator device configured to reciprocate the first gear and rotate the carrier.
Figure 6:
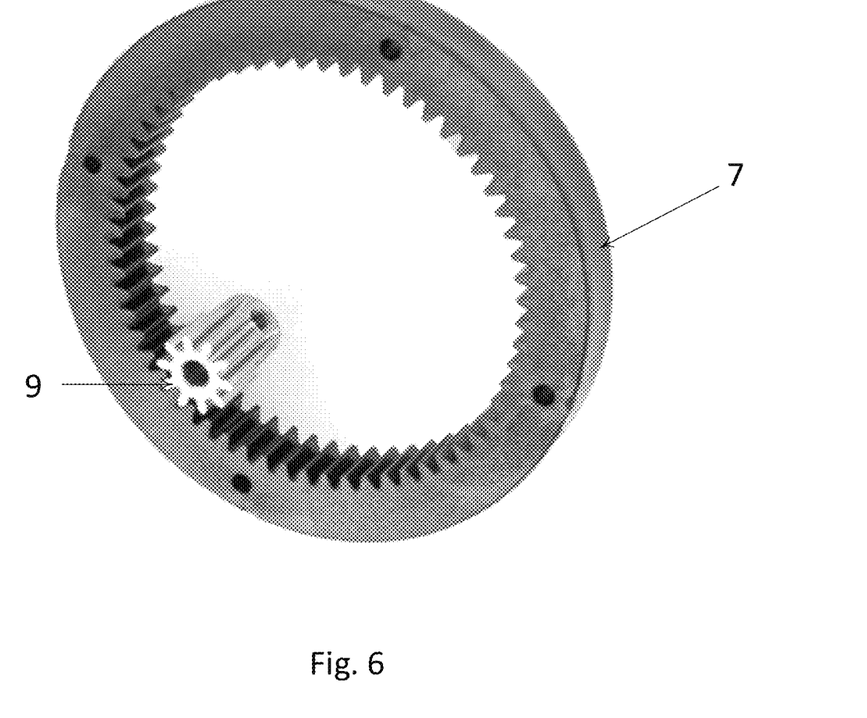
FIG. 6 schematically illustrates an embodiment where the second gear is arranged inside the first gear shaped as a circular toothed rim.

Reference is made to FIGS. 5A-5 disclosing inter alia a rotating device 28 according to a preferred embodiment. The rotating device 28) typically forms part of the part of the actuator device configured to reciprocate the first gear and rotate the carrier. In such embodiments, the actuator device 11 comprises a rotating device 28 having a rotating element 29 a guiding element 30. The guide element is preferably maintained in a fixed position, during reciprocating movement of the first gear 7.

The guiding element 30 comprises two guides 31. More guides may be present, but two is found provide an excellent guiding. The guides 31 and the rotating element 29 are mutually configured to provide a rotation of the rotating element 29 when the rotating element 29 is moved along and/or in said guides 31. In FIG. 5C the rotation is indicated by a semi-circular arrow attached to the rotating element 29 and the movement along the guides 31 is indicated by the double arrowed line attached to the rotating element 29. Thus, as the rotating element 29 moves in the direction of the double arrowed line, the rotating element carries out a rotation. The amount of rotation is preferably in the order of 180 degrees, such as substantially 180 degrees but the rotation may be more or less than 180 degrees.

Kindly observe that in FIG. 5C the rotating element 29 is illustrated as a cylindrical element whereas in FIG. 5A and FIG. 5B, the rotating element 29 is illustrated as a box-shaped element.

The rotating element 29 is connected to the carrier 8 to rotate said carrier. Such a connection is typically a mechanical connection such as a shaft 23 shown in FIG. 5B. Thereby, a rotation of the rotating element 29 provided by a movement in the direction of the double arrowed line provides a rotation of the rotating elements and thereby also a rotation of the carrier 8 and the second gear 9.

In the preferred embodiment shown in FIG. 5C, guides 31 comprises two indentations formed in said guiding element 30. The guiding element 30 is preferably arranged so that the indentations proceed along the direction being perpendicular to the longitudinal direction. In connection with FIG. 1A, this means that the guiding element 30 preferably is placed with the guides 31 proceeding in the y-direction and facing in the negative x-direction when arranged to the right in FIG. 1A. It is noted that "proceed along" does not mean that the guides proceed parallel to the direction in question, as sections of the guides 31 may be characterized as being meandering.

The rotating element 29 comprises two projections 32 each engaging one said indentations. In FIG. 5C one of the projections 32 are visible. In the embodiment of FIG. 5A-C, the projections 32 engages with the indentations by being at least partly received in the indentations. To allow for a smooth movement of the projections 32 within the indentations, the projections 32 may comprise a friction reducing component, such a bearing, for to reduce friction between abutting surfaces.

In the embodiment illustrated in FIG. 5C, the rotation of the rotating element 29 is provided by the two guides 31 proceed from a first region 33 convergently toward each other and merge into each other in a second region 34. From the second region 34, the two guides 31 proceed divergently away from each other in a third region 35. Thus, as the rotating element 29 has two projections 32 which extend into a separate indentation, and the distance between the guides decreases in the second region 34, the rotating element 29 is forced to rotate, as the distance between the two projections 32 is constant. When the guides diverges, the projections have changed places and begin to engage with a non-merged guide part to complete the rotation of the rotating element 29.

In preferred embodiments, a rotational axis of the rotating element 29 is substantially parallel with a rotational axis of the second gear 9. By this, a need for e.g. a worm gear has been avoided.

As indicated in FIGS. 5A and 5B, the rotating element 29 is typically arranged on a shaft 23 proceeding through the hub part 27 (see also FIGS. 4A and 4B). As perhaps most clearly visible from FIG. 4A, the guide element 30 is in a fixed position and by moving the hub part 26 up and down along the linear rails, the protrusions of the rotating element 29 which engages with guides 31 will rotate due to the proceed of the guides 31. As the rotating element 29 is connected to the carrier 8, the second gear 9 will be rotated whereby the placement devices 4 are moved between the first position 12 wherein the fixed positions faces in an first direction 13 and a second position 14 wherein the fixed positions faces in a second direction 15.

As disclosed herein the device places lids onto containers and such containers are preferably open ended in the sense that the lids placed covers the open ends of the containers. Such lids may be lids which fluidicly seal the containers or may be a lid placed on the containers to which a fluidicly sealing lid has already been placed. In the latter case, such lids are typically lids which protects the fluidicly sealing lids.

Lidding of a container follow typically after one or more substances are filled into the container in a filling system. Thus, preferred embodiments relates to a filling and lidding system comprising a conveyer comprising at least one row of receptacles each for receiving a container. This conveyer conveys the receptacle to a station at which containers are placed in the receptacles with the open end of the containers facing upward. After containers are placed in the receptacles, the conveyer conveys the open ended container to a filling station comprising a filling device filling one or more substances into containers received in the receptacles.

The containers with their content are conveyed to a lidding station comprising a device for placing lids onto containers according to an embodiment of the invention. At the lidding station, a lid is placed on the container, typically covering an open end of the container. In embodiment, where the lids are to provide a fluidic seal, such sealing is typically provided by a welding technique such as ultrasonic welding, contact heal seal or the like. While a device for placing lids could be adapted to provide such welding technique, preferred embodiments comprises conveying the containers with lids to a welding station at which the welding is carried out.

If a protective lid is to be placed above the lid providing a fluidic seal, the containers with the welded lids are conveyed to another device for placing lids onto containers according to an embodiment of the invention. At this lidding station, protective lids are placed on the containers.

ITEMIZED LIST OF PREFERRED
EMBODIMENTS

Item 1. A device (1) for placing lids (2) onto containers (16), the device comprising
  a number of placement devices (4) each
    being configured to releasable retain a lid (2) in a fixed position (3) relatively to the placement device (4), and
    being moveable in a longitudinal direction of the device (1),
  a non-rotational first gear (7) being moveable reciprocatable in a direction being perpendicular to said longitudinal direction, a carrier (8) rotationally arranged around a centre of the first gear (7) and a second gear (9) having a radius smaller than the radius of the first gear (7) and being rotationally arranged on said carrier (8), wherein said first and said second gears are in toothed engagement or said first and second gears are connected by a toothed belt (25);
  a number of moving elements (5) arranged on a shaft (6) extending in said longitudinal direction, said shaft (6) is connected to the second gear (9) to rotate said shaft (6) by rotation of said second gear (9), each of said moving element (5) is configured to co-operate with one of said placement devices (4) to provide longitudinal movement of one of said placement device (4) upon a rotation of said shaft (6), a frame (10) carrying said placement device (4) while allowing for said longitudinal movement in said longitudinal direction, said frame (10) being connected to said carrier (8), an actuator device (11) being configured to reciprocate said first gear (7) and rotate said carrier (8) whereby the placement devices (4) are moved between a first position (12) wherein said fixed positions faces in an first direction (13) and a second position (14) wherein said fixed positions faces in a second direction (15) and whereby the placement devices (4) are moved longitudinally.

Item 2. A device according to item 1, wherein the moving elements (5) are further configured to provide an amount of longitudinal movement of said placement devices (4) so that a first longitudinal distance (d1) between neighbouring placement devices (4) in said first position (12) is smaller than a second longitudinal distance (d2) between said neighbouring placement devices (4) in said second position (14).

Item 3. A device according to item 2, wherein said distance (d1) equals the distance between two neighbouring lids in an associated row of lids.

Item 4. A device according to item 2 or 3, wherein said second distance (d2) equals the distance between two neighbouring container receptacles in an associated conveyer device for conveying said containers (16) while being received in the receptacles.

Item 5. A device according to any one of the preceding items, wherein each of said moving element (5) is configured to co-operate with one of said placement devices to provide said longitudinal movement, by each of said moving element comprising a guide (17) and each of said placement devices (4) comprises a follower (18) engaging said guide (17).

Item 6. A device according to item 5, wherein each of said guides (17) is a groove and each of said followers (18) is a pin having at least a section shaped to fit snuggly within said groove.

Item 7. A device according to any one of the preceding items, wherein each of said placement devices (4) comprises a suction disc (19) to retain said lid (2) in said fixed position by a vacuum and release said lid (2) by release of said vacuum.

Item 8. A device according to any one of the preceding items, further comprising a lid separating device (20) configured to separate two neighbouring lids in an associated row of lids, while said two neighbouring lids are retained in said fixed position with the device in said first position (12).

Item 9. A device according to item 8, wherein said lid separating device (20) comprising an edged device (21), such as a knife, arranged on an activatable actuator (22) configured to upon activation to press an edge of the edged device (21) against a surface of said associated row of lids to provide a separation of said associated row of lids into individual lids.

Item 10. A device according to item 8, wherein said lid separating device (20) comprising an edged device (21), such as a knife, arranged at a fixed position above a feed plane of said associated row of lids, and wherein said placement devices (4) are configured to move said associated row of lids towards said edged device (21) and press a surface of said associated rows of lids to provide a separation of said associated row of lids into individual lids.

Item 11. A device according to any one of the preceding items, wherein said actuator device (11) comprising an electrical or pneumatic motor (22) having an axle (23) connected to said carrier (8) to rotate said carrier upon rotation of said axle (23) or connected to said frame (10) to rotate said frame (10) by said electrical or pneumatic motor (22).

Item 12. A device according to any one of the preceding items 1-9, wherein said actuator device (11) comprising an electrical or pneumatic motor (22) having an axle (23) connected to said second gear (9) to rotate said second gear (9) upon rotation of said axle (23) by said electrical or pneumatic motor (22).

Item 13. A device according to any one of the preceding items, further comprising a linear guide element having a hub part (26) and one or more linear rails (27), wherein said hub part (26) is slidably arranged on said linear rails (27), said carrier (8) is rotatable arranged on said hub part (26), said first gear (7) is non-rotatable arranged on said hub part (26), and said hub part (26) is connected to said actuator device to reciprocate said hub part (26) and thereby provide said reciprocatable movement of said first gear (7).

Item 14. A device according to item 13, wherein said actuator device comprises a linear actuator, such as an electrical or a pneumatic actuator.

Item 15. A device according to any one of the preceding items, wherein said containers are open-ended.

Item 16. A device according to any one of the preceding items, wherein said actuator device (11) comprises a rotating device (28) comprising
a rotating element (29)
a guiding element (30) wherein
said guiding element (30) comprises two guides (31) wherein said guides (31) and the rotating element are mutually configured to provide a rotation of the rotating element (29) when the rotating element (29) is moved along and/or said guides (31), and
said rotating element is connected to said carrier (8) to rotate said carrier.

Item 17. A device according to item 16, wherein
said guides (31) comprises two indentations formed in said guiding element (30), said indentations proceed along said direction being perpendicular to said longitudinal direction, and
said rotating element (29) comprises two projections (32) each engaging one said indentations.

Item 18. A device according to item 17, wherein said two guides (31) proceed from a first region (33) convergently toward each other and merge into each other in a second region (34), wherein said two guides (31) proceed divergently away from each other in a third region (35).

Item 19. A deice according to any one of items 16-18, wherein a rotational axis of the rotating element (29) is substantially parallel with a rotational axis of the second gear (9).

Item 20. A filling and lidding system comprising
a conveyer comprising at least one row of receptacles each for receiving a container,
a filling device for filling one or more substances into containers received in at least one or more of said receptacles;
a device according to any one of the preceding claims for placing lids onto said containers when received in said receptacles,
wherein said filling and lidding system is configured to convey the receptacle including said containers to said filling device;

fill said one or more substances into said containers;

convey the receptacle including said container to said device according to any one of the preceding items, and place a lid (2) onto at least one or more of said containers.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Device
2 Lid
3 Fixed position
4 Placement device
5 Moving element
6 Shaft
7 First gear
8 Carrier
9 Second gear
10 Frame
11 Actuator device
12 First position
13 First direction
14 Second position
15 Second direction
16 Container
17 Guide
18 Follower
19 Suction disc
20 Lid separating device
21 Sharp element
22 Motor
23 Axle
24 Fixture
25 Toothed belt
26 Hub part
27 Linear rail
28 Rotating device
29 Rotating element
30 Guiding element
31 Guides
32 Projections
33 First region
34 Second region
35 Third region
d1 First longitudinal distance
d2 Second longitudinal distance

The invention claimed is:

1. A device for placing lids onto containers, the device comprising:

a number of placement devices each being configured to releasable retain a lid in a fixed position relative to the placement device, and being moveable in a longitudinal direction of the device, a non-rotational first gear being moveable reciprocally in a direction perpendicular to said longitudinal direction, a carrier rotationally arranged around a center of the first gear and a second gear having a radius smaller than the radius of the first gear and being rotationally arranged on said carrier, wherein said first and said second gears are in toothed engagement or said first and second gears are connected by a toothed belt;

a number of moving elements arranged on a shaft extending in said longitudinal direction, said shaft is connected to the second gear to rotate said shaft by rotation of said second gear, each of said moving element is configured to co-operate with one of said placement devices to provide longitudinal movement of one of said placement device upon a rotation of said shaft, a frame carrying said placement device while allowing for said longitudinal movement in said longitudinal direction, said frame being connected to said carrier, and an actuator device being configured to reciprocate said first gear and rotate said carrier whereby the placement devices are moved between a first position wherein said fixed positions faces in an first direction and a second position wherein said fixed positions faces in a second direction and whereby the placement devices are moved longitudinally.

2. The device according to claim 1, wherein the moving elements are further configured to provide an amount of longitudinal movement of said placement devices so that a first longitudinal distance between neighboring placement devices in said first position is smaller than a second longitudinal distance between said neighboring placement devices in said second position.

3. The device according to claim 2, wherein said first longitudinal distance equals the distance between two neighboring lids in an associated row of lids.

4. The device according to claim 2, wherein said second longitudinal distance equals the distance between two neighboring container receptacles in an associated conveyer device for conveying said containers while being received in the container receptacles.

5. The device according to claim 1, wherein each of said moving elements is configured to co-operate with one of said placement devices to provide said longitudinal movement, by each of said moving elements comprising a guide and, wherein each of said placement devices comprises a follower engaging said guide.

6. The device according to claim 5, wherein each of said guides is a groove and each of said followers is a pin having at least a section shaped to fit snugly within said groove.

7. The device according to claim 1, wherein each of said placement devices comprises a suction disc to retain said lid in said fixed position by a vacuum and release said lid by release of said vacuum.

8. The device according to claim 1, further comprising a lid separating device configured to separate two neighboring lids in an associated row of lids, while said two neighboring lids are retained in said fixed position with the device in said first position.

9. The device according to claim 8, wherein said lid separating device comprises an edged device or a knife, arranged on an activatable actuator configured to, upon activation, press an edge of the edged device or knife against a surface of said associated row of lids to provide a separation of said associated row of lids into individual lids.

10. The device according to claim 8, wherein said lid separating device comprises an edged device or a knife, arranged at a fixed position above a feed plane of said associated row of lids, and wherein said placement devices are configured to move said associated row of lids towards said edged device or knife and press a surface of said associated rows of lids to provide a separation of said associated row of lids into individual lids.

11. The device according to claim 1, wherein said actuator device comprises an electrical or pneumatic motor having an axle connected to said carrier to rotate said carrier upon rotation of said axle or connected to said frame to rotate said frame by said electrical or pneumatic motor.

12. The device according to claim 1, wherein said actuator device comprises an electrical or pneumatic motor having an axle connected to said second gear to rotate said second gear upon rotation of said axle by said electrical or pneumatic motor.

13. The device according to claim 1, further comprising a linear guide element having a hub part and one or more linear rails, wherein:
said hub part is slidably arranged on said linear rails,
said carrier is rotatable arranged on said hub part,
said first gear is non-rotatable arranged on said hub part, and
said hub part is connected to said actuator device to reciprocate said hub part and thereby provide said reciprocal movement of said first gear.

14. The device according to claim 13, wherein said actuator device comprises a linear actuator, or an electrical or a pneumatic actuator.

15. The device according to claim 1, wherein said containers are open-ended.

16. The device according to claim 1, wherein said actuator device comprises
a rotating device comprising:
a rotating element; and
guiding element; wherein:
said guiding element comprises two guides, wherein said guides and the rotating element are mutually configured to provide a rotation of the rotating element when the rotating element is moved along and/or in said guides, and
said rotating element is connected to said carrier to rotate said carrier.

17. The device according to claim 16, wherein:
said guides comprise two indentations formed in said guiding element, wherein said indentations proceed along said direction being perpendicular to said longitudinal direction, and
said rotating element comprises two projections each engaging one of said indentations.

18. The device according to claim 17, wherein said two guides proceed from a first region convergently toward each other and merge into each other in a second region and, wherein said two guides proceed divergently away from each other in a third region.

19. The device according to claim 16, wherein a rotational axis of the rotating element is substantially parallel with a rotational axis of the second gear.

20. A filling and lidding system comprising:
a conveyer comprising at least one row of receptacles each for receiving a container;
a filling device for filling one or more substances into containers received in at least one or more of said receptacles;
a device according to claim 1 for placing lids onto said containers when received in said receptacles, wherein said filling and lidding system is configured to:
convey the receptacle including said containers to said filling device;
fill said one or more substances into said containers; and
convey the receptacle including said container to said device according to claim 1, and place a lid onto at least one or more of said containers.

* * * * *